United States Patent [19]

Guagliardo et al.

[11] 4,429,994
[45] Feb. 7, 1984

[54] SYSTEM FOR REMOTELY DETERMINING VELOCITY OF SOUND IN WATER

[75] Inventors: John L. Guagliardo, Lynnfield, Mass.; Harold L. Dufilho, Carriere, Miss.

[73] Assignee: The United States of America as represented by the Secretary of the Navy, Washington, D.C.

[21] Appl. No.: 219,291

[22] Filed: Dec. 22, 1980

[51] Int. Cl.³ .......................... G01P 3/36; G01B 9/02
[52] U.S. Cl. ................................ 356/28.5; 340/850; 356/346; 356/352
[58] Field of Search .................. 356/346, 352, 28.5; 340/850

[56] References Cited

U.S. PATENT DOCUMENTS

| | | | |
|---|---|---|---|
| 3,474,253 | 10/1969 | Kessler | 340/850 |
| 3,532,427 | 10/1970 | Paine et al. | 356/28.5 |
| 3,533,697 | 4/1970 | Hughes | 356/5 |
| 3,611,277 | 10/1971 | Yoder | 356/5 |
| 3,619,624 | 11/1971 | Sorenson | 356/338 |
| 3,638,001 | 1/1972 | Gordon | 235/152 |
| 3,669,540 | 6/1972 | Rattman et al. | 356/4 |
| 3,958,881 | 5/1976 | Keene et al. | 356/28.5 |
| 3,970,389 | 2/1974 | Mendrin et al. | 356/106 R |
| 4,035,080 | 7/1977 | Yamaguchi | 356/338 |
| 4,130,360 | 12/1978 | Courtenay | 356/4 |
| 4,149,118 | 4/1979 | Winterling et al. | 356/352 |
| 4,168,906 | 9/1979 | Schwiesow | 356/28.5 |
| 4,182,570 | 1/1980 | Courrier et al. | 356/28 |
| 4,190,366 | 2/1980 | Doyle | 356/346 |

OTHER PUBLICATIONS

LEVIS et al., "An Optical Radar for Airborne Use Over Natural Waters" 25-28 Sep. 1973 IEEE Ocean Conference, pp. 76-83.

Primary Examiner—S. C. Buczinski
Attorney, Agent, or Firm—Francis I. Gray; R. F. Beers

[57] ABSTRACT

A system for remotely sensing the velocity of sound in water using Brillouin scattering. A pulsed laser irradiates the water and the scattered light is collected, collimated and passed through a Fabry-Perot interferometer, then to a photomultiplier. The photomultiplier output is digitized. The interferometer is driven by a ramp generator, and the instantaneous voltage corresponds to the point in the frequency domain to which the digitized output corresponds. For each spectrum, a plurality of laser shots is obtained. A register contains the record of each shot, and when full its contents are transferred to a storage medium. A computer reads the storage medium and develops a three dimensional graphic representation the axes of which are frequency, intensity and depth.

11 Claims, 3 Drawing Figures

4,429,994

SYSTEM FOR REMOTELY DETERMINING VELOCITY OF SOUND IN WATER

BACKGROUND OF THE INVENTION

1. Field of the Invention

The present invention relates to a system for remotely determining the velocity of sound in water, and more particularly to a system using range resolved Brillouin scattering with a pulsed laser.

2. Description of the Prior Art

The measurement of sound velocity in water, especially the ocean, is now done by using various expendable and non-expendable in-situ sensors. It is desired to build a remote sensing instrument to supplement these previous methods and give wide area coverage, and which can map sound velocity in both the horizontal and vertical directions.

When a beam of monochromatic light passes through a transparent fluid, inhomogeneities in density produce scattering. Inhomogeneities in density which are in motion will produce a shift in the frequency of the scattered light due to the Doppler effect. If the inhomogeneities are periodic, and they satisfy the Bragg equation $$\lambda_{op} = 2n\lambda_{ac} \cos\theta \tag{1}$$

where $\lambda_{op}$ is the wavelength of the light, n is the index of refraction of the medium, $\lambda_{ac}$ is the wavelength of the inhomogeneity and $\theta$ is the angle between the incident light wave and the axis of propagation of the periodic inhomogeneity, there will be a maximum in the scattering due to contructive interference between the photons scattered from each layer of density inhomogeneity.

Sound waves are characterized by such periodic inhomogeneities in density. Brillouin predicted the magnitude of the shift due to sound waves to be $$\omega_B = \frac{4\pi C_o n}{\lambda_{op}} \sin\theta/2 \tag{2}$$

where $\omega_B$ is the Brillouin shift in frequency, $C_o$ is the speed of sound in the medium and $\theta$ is the angle between the incident and the scattered light wave vectors. Almost since its inception the CW gas laser has been used in the measurement of Brillouin scattering. The advantage of the CW laser is its monochromaticity and narrow line width. The disadvantage in using the CW laser in a remote sensing instrument is that range resolution must be achieved by bistatic or focusing techiques which are slow and suffer from decreasing range accuracy with increasing range. If Brillouin scattering could be used, the desired remote sensing instrument could be built.

SUMMARY OF THE INVENTION

Accordingly, the present invention provides a system for remotely sensing the velocity of sound in water using Brillouin scattering. A pulsed laser irradiates the water and the scattered light is collected. Collimated and passed through a Fabry-Perot interferometer, then to a photomultiplier. The photomultiplier output is digitized. The interferometer is driven by a ramp generator, and the instantaneous voltage corresponds to the point in the frequency domain to which the digitized output corresponds. For each spectrum, a plurality of laser shots is obtained. A register contains the record of each shot, and when full its content are transferred to a storage medium. A computer reads the storage medium and develops a three dimensional graphic representation the axes of which are frequency, intensity and depth.

Therefore, it is an object of the present invention to provide a system for remotely sensing the velocity of sound in water.

Another object of the present invention is to provide a remote sensing system which effectively uses Brillouin scattering.

Other objects, advantages and novel features of the present invention will be apparent from the following detailed description when read in conjunction with the appended claims and attached drawing.

DESCRIPTION OF THE PREFERRED EMBODIMENT

Figure 1:
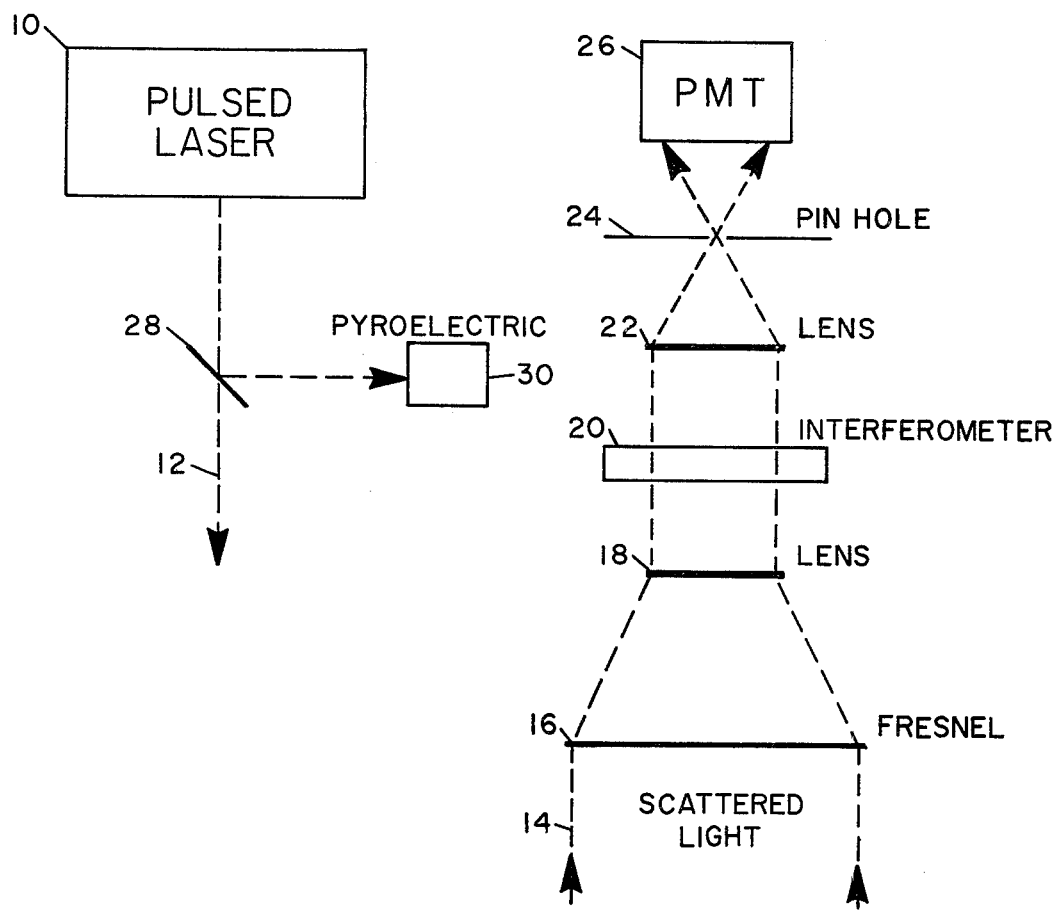
FIG. 1 is a simplified block diagram of the optics according to the present invention.

Referring now to FIG. 1 a pulsed laser 10, such as a nitrogen laser pumped dye laser with a 10 Kw output and 0.01 Å line width, transmits a light pulse 12 into a medium such as the ocean. The light pulse 12 is scattered from the medium at various depths and the scattered light 14 is collected by a Fresnel lens 16. Collimated by another lens 18 and passed through a Fabry-Perot interferometer 20. The output of the interferometer 20 is passed through a third lens 22/pinhole 24 combination to a photomultiplier 26. A portion of the transmitted laser light is detected by a beam splitter 28 and pyroelectric converter 30 combination to determine the energy level of the light pulse.

Figure 2:
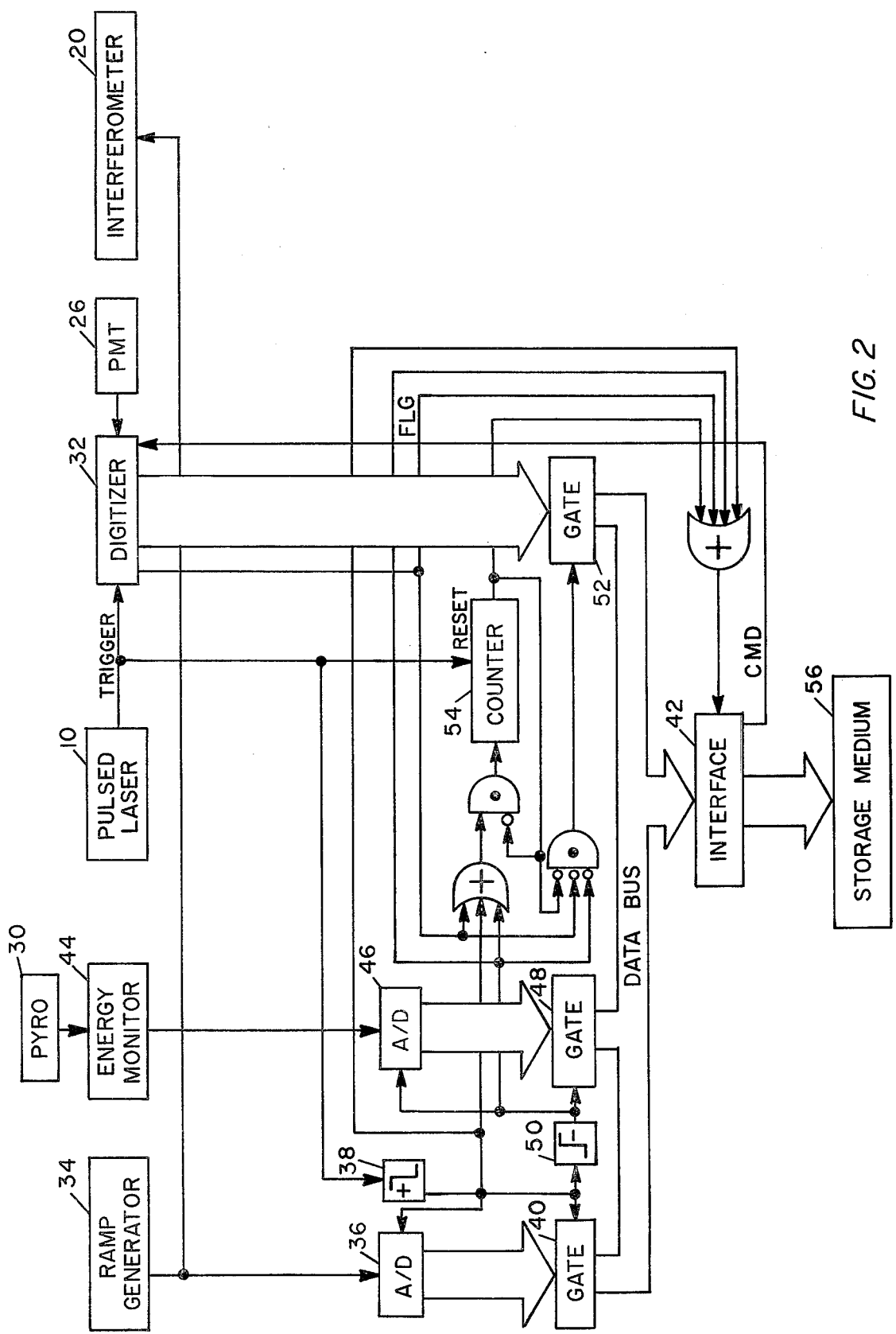
FIG. 2 is a block diagram of the signal processing according to the present invention.

As shown in FIG. 2 a trigger from the laser 10 enables a transient digitizer 32 to digitize the output of the photomultiplier 26. For a laser pulse duration of seven nanoseconds and a digitization rate of 10 nanoseconds. 500 miles of vertical range is attainable. All of this range can be placed in the water, even if the instrument package is airborne, because the digitizer 32 can have a trigger delay feature to compensate for the altitude above the medium.

The piezoelectric transducers of the interferometer 20 are driven by a ramp generator 34. Since the transducers are biased to center the spectrum, this instantaneous ramp voltage relative to start and finish of the ramp corresponds to that point in the frequency domain to which the digitized photomultiplier output corresponds, i.e., the start and finish of the ramp sweep establish the frequency domain to be examined. The duration of the ramp can be varied, so a variable number of laser shots can be included in each spectrum.

An analog-to-digital converter 36, which is gated by the leading edge of the laser pulse via a leading edge detector 38, converts the ramp voltage to a digital word which is passed by a gate 40, turned on by the leading edge detector 38, to an interface buffer 42.

The detected laser power from the pyroelectric converter 30 is sensed by an energy monitor 44, converted to a digital word by an A/D converter 46, passed by a second gate 48 to the interface 42. A trailing edge detector 50, enabled by the leading edge detector 38, detects the trailing edge of the laser pulse and enables the A/D converter 46 and the second gate 48. The digitized photomultiplier output is input to a third gate 52 and is passed to the interface 42 after the ramp voltage and power level words have been transmitted. A counter 54 counts each word which is transferred to the interface 42 until a specified number, X, is attained, such as 512. When X is attained the counter 54 is inhibited until reset by the next laser pulse, and the third gate 52 is also disabled. Thus, a complete message containing X words is stored in the interface 42. By using a dual buffer interface 42, when data is transferred to a storage medium 56, such as a tape recorder, from one buffer, the second buffer is being filled.

When the storage medium 56 is read by a computer the first and second words of each message are separated. The power monitor output is used to normalize the entire X-2 word data message to negate the possibility of fast changes in power perturbing the spectrum, and the ramp generator voltage is used to place the particular data word, range gate by range gate, i.e., laser shot by laser shot, in a three dimensional record or graphic representation having axes of frequency, intensity and depth.

The pulsed laser 10 and range gated signal processing provide the requisite range resolution, integration techniques are used to measure the Brillouin frequency shift, and a Brillouin spectrum is taken for each range gate to measure sound velocity changes with depth. The maximum sound velocity accuracy is achieved when the number of spectral elements taken per free spectral range is equal to or greater than the finesse of the interferometer. It is, therefore, necessary to have a number of laser shots equal to the finesse of the interferometer captured for each range gate to "build up" the high resolution spectrum of the scattered laser light.

Figure 3:
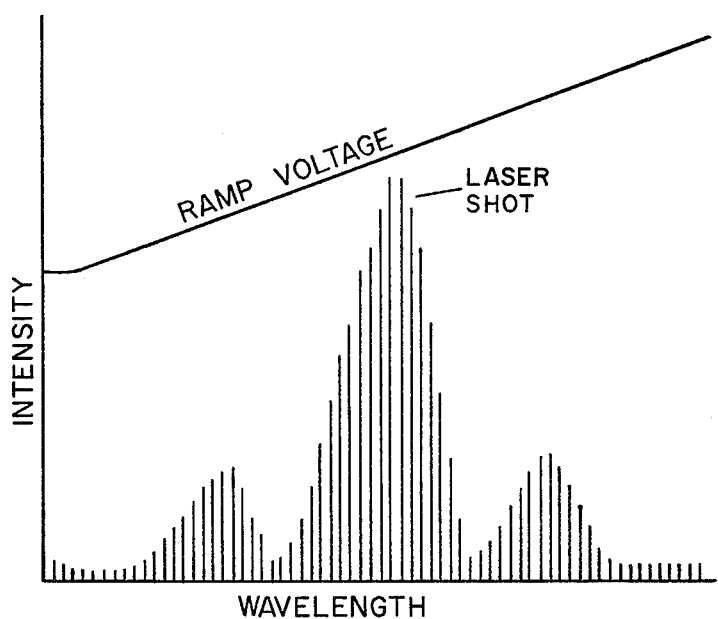
FIG. 3 is a graph of a Brillouin spectrum produced by the present invention.

In operation, the laser 10 is pulsed and the trigger pulse resets the counter 54 and enables the digitizer 32. A portion of the laser shot 12 is sent by the beam splitter 28 to the pyroelectric converter 30 to determine the power output level of the laser 10. The trigger pulse also sets the leading edge detector 38 which momentarily opens the first gate 40 to allow the digitized ramp voltage onto the DATA BUS as the first word of the data message. The leading edge detector 38 also enables the trailing edge detector 50 and increments the counter 54 by one. The trailing edge detector 50 momentarily opens the second gate 48 to allow the digitized power level onto the DATA BUS as the second word of the data message, and also increments the counter 54 by one. After the first two words, the third gate 52 is opened to allow subsequent data words from the digitizer 32 onto the DATA BUS until the data message is complete. When the data message is complete, the counter 54 closes the third gate 52 to inhibit further data words from the quantizer 32 from passing to the DATA BUS. The data message is stored in the interface unit 42 which commands the digitizer 32 off when the message is complete. The data message is then transferred from the interface unit 42 to the storage medium 56 for further processing by a computer. FIG. 3 shows a Brillouin spectrum built up from many laser shots during one sweep of the ramp voltage. If the maximum repetition rate of the combination of laser 10, digitizer 32, interface 42 and storage medium 56 is 40 pps, and the finesse of the interferometer 20 is 200, then a five second ramp duration could be chosen to achieve maximum resolution.

Vertical velocity of sound measurements can be determined from each "built up" Brillouin spectrum, and horizontal velocity of sound measurements can be determined from a plurality of such Brillouin spectrums taken along the path of the instrumentation vehicle, be it airborne or surface. The result is a remote sensing instrument for collecting Brillouin scattered light data from which the velocity of sound in a medium, such as the ocean, can be determined with high resolution in both vertical and horizontal directions.

What is claimed is:

1. A remote sensing instrument comprising:
   (a) means for transmitting pulses of light into a medium;
   (b) means for collecting Brillouin scattered light from said medium;
   (c) means for analyzing said scattered light over a frequency spectrum;
   (d) means for obtaining a plurality of samples of said scattered light for each of said light pulses; and
   (e) means for storing said samples together with a measure of the power of said light pulse and a measure of the point in said frequency spectrum at which said samples are obtained for each of said light pulses.

2. A remote sensing instrument as recited in claim 1 wherein said transmitting means comprises:
   (a) a pulsed laser to transmit said light pulses;
   (b) a pyroelectric detector; and
   (c) a beam splitter for diverting a portion of said light pulses to said pyroelectric detector.

3. A remote sensing instrument as recited in claim 2 wherein said collecting means comprises:
   (a) a light amplifier detector; and
   (b) Fresnel lens system for collimating and focusing said scattered light onto said light amplifier detector.

4. A remote sensing instrument as recited in claim 3 wherein said analyzing means comprises:
   (a) a Fabry-Perot interferometer interposed in the path of said scattered light; and
   (b) means for sweeping said interferometer over said frequency spectrum.

5. A remote sensing instrument as recited in claim 4 wherein said sweeping means comprises a ramp generator to drive the transducers of said interferometer across said frequency spectrum, said transducers being biased to the center of said frequency spectrum.

6. A remote sensing instrument as recited in claim 5 wherein said obtaining means comprises a digitizer connected to the output of said light amplifier detector, said digitizer having a repetition rate such that said plurality of samples is obtained for each of said light pulses.

7. A remote sensing instrument as recited in claim 6 wherein said storing means comprises:
   (a) a first means for digitizing the output of said ramp generator for each of said light pulses;
   (b) a second means for digitizing the output of said pyroelectric detector for each of said light pulses;
   (c) means for combining the output of said first and second digitizing means with said digitized plurality of samples on a DATA BUS to form a data message for each of said light pulses; and
   (d) means for transferring said data message to a storage medium.

8. A remote sensing instrument as recited in claim 7 wherein said first digitizing means comprises:
   (a) a first analog-to-analog converter at the output of said ramp generator; and
   (b) a first means for detecting the leading edge of a trigger from said transmitting means, said trigger corresponding to each of said light pulses, said first detecting means enabling said first analog-to-digital converter when the leading edge of said trigger is detected.

9. A remote sensing instrument as recited in claim 8 wherein said second digitizing means comprises:
   (a) a second analog-to-digital converter at the output of said pyroelectric detector; and
   (b) a second means for detecting the trailing edge of said trigger to enable said second analog-to-digital converter when said trailing edge is detected.

10. A remote sensing instrument as recited in claim 9 wherein said combining means comprises:
   (a) a first gate which is turned on momentarily by said first detecting means to transmit the output of said first analog-to-digital converter to said DATA BUS to form a first word for said data message;
   (b) a second gate which is turned on momentarily by said second detecting means to transmit the output of said second analog-to-digital converter to said DATA BUS to form a second word for said data message;
   (c) a third gate which is turned on momentarily for each of said plurality of samples after said first and second words have been transmitted to said DATA BUS to transmit the output of said digitizer to said DATA BUS to form data words for said data message; and
   (d) means for terminating the transmission of data data words to said DATA BUS when said data message is complete.

11. A remote sensing instrument as recited in claim 10 wherein said terminating means comprises:
   (a) a counter which counts each word transmitted to said DATA BUS; and
   (b) means for inhibiting said third gate when said counter has reached X, X being the number of words of said data message.

* * * * *